United States Patent

[11] 3,524,374

| [72] | Inventor | Lucien Diolot<br>Neuilly sur Seine, France |
|---|---|---|
| [21] | Appl. No. | 622,149 |
| [22] | Filed | March 10, 1967 |
| [45] | Patented | Aug. 18, 1970 |
| [73] | Assignee | Societe Nouvelle Spidem,<br>Paris, France |
| [32] | Priority | March 11, 1966 |
| [33] | | France |
| [31] | | No. 53194 |

[54] SHEARING MACHINE FOR CONTINUOUS METAL SHEET
9 Claims, 3 Drawing Figs.

[52] U.S. Cl. .................................................. 83/626, 83/630, 83/639
[51] Int. Cl. ........................................................ B26d 5/12, B26d 5/18
[50] Field of Search ......................................... 83/624–626, 630, 639; 100/272

[56] References Cited
UNITED STATES PATENTS

| 986,809 | 3/1911 | Derbyshire et al. | 83/630 |
| 2,532,672 | 12/1950 | Michael et al. | 83/630X |
| 2,612,951 | 10/1952 | Palmleaf | 83/639X |
| 2,633,094 | 3/1953 | Muller | 100/272X |
| 2,758,649 | 8/1956 | Anderson et al. | 83/630X |
| 2,928,305 | 3/1960 | Heth et al. | 83/630X |
| 3,198,108 | 8/1965 | Ingold | 100/272X |

FOREIGN PATENTS

| 561,169 | 7/1958 | Canada | 83/630 |

*Primary Examiner*— James M. Meister
*Attorneys*—Craig, Antonelli, Stewart and Hill

ABSTRACT: Rapid-cutting guillotine shearing machine for continuously moving metal sheet, the cutting blade being controlled by a fluid jack having a reciprocating jack rod executing one cut for each direction of movement of the jack rod, said jack being supplied with fluid by an electromagnetic valve having a fluid passage of considerable cross section, the jack rod being provided with end-of-travel damping device.

INVENTOR.
LUCIEN DIOLOT

SHEARING MACHINE FOR CONTINUOUS METAL SHEET

Guillotine shearing machines for profiled or corrugated metal sheets are already known wherein the cutting blade is controlled by a pneumatic or hydraulic jack in such a manner as to carry out a forward and return operation of the cutting blades for a single travel of the jack in one direction or in the other.

A shearing machine of this type was described in the French patent specification No. 1,004,954, in the name of the applicants and entitled "Apparatus for Cutting Metal Sheets".

The same type of shearing machine can also be used for the cutting of flat metal sheets, and more particularly for cutting out sections from a strip passing along continuously at a high speed through the shearing machine. It is necessary in this case to obtain an increase in the operating speed of the shearing machine, and to take the necessary measure for ensuring satisfactory squaring, and this is what constitutes the object of the present invention.

BRIEF DESCRIPTION OF THE INVENTION

The invention relates to a rapid-cutting guillotine shearing machine for cutting metal sheet passing continuously at a high speed, the cutting blade being controlled by a fluid jack executing one cut for each direction of movement of the jack rod, this shearing machine comprising more particularly the feature that the jack is supplied with fluid compressed by an electromagnetic valve having a passage of considerable cross section, the jack rod being provided with an end-of-travel damping device.

An example of one exemplary embodiment of such a shearing machine will now be described hereinafter with reference to the accompanying drawings wherein:

FIGURE 1 is a cross section of the machine, the right-hand casing being drawn in elevation and the left-hand casing in section, each casing enclosing and protecting a damping device, FIGURE 2 is a sectional view of the right-hand casing, and FIGURE 3 is a schematic diagram of the control means for the machine according to one embodiment as hereinafter disclosed.

DETAILED DESCRIPTION OF THE INVENTION

Figure 1:
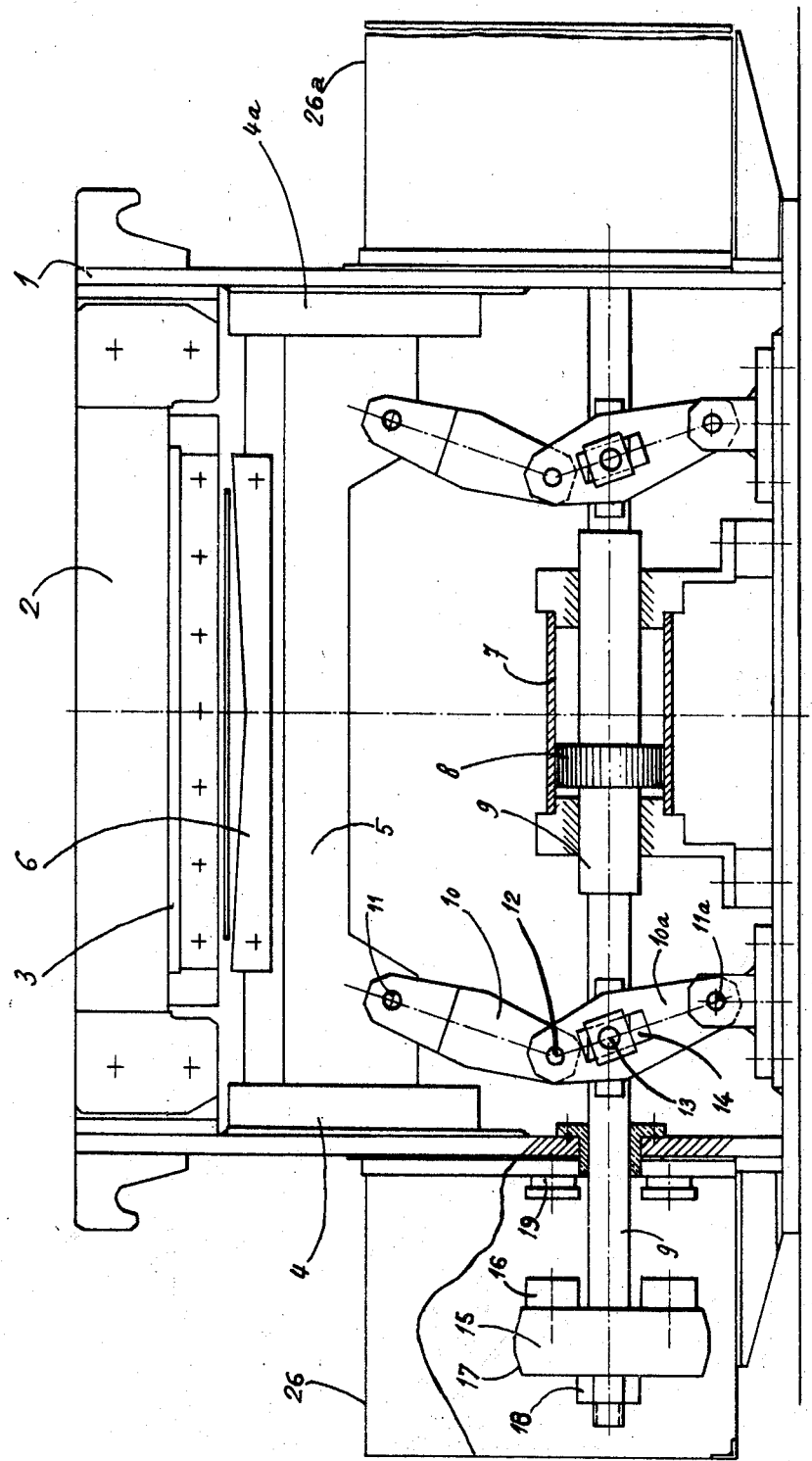

As illustrated in FIGURE 1, the shearing machine comprises a frame 1 whose upper cross-member 2 serves as a support for the fixed blade 3. On the lateral uprights of the frame 1 there are fixed vertical slideways 4 and 4a in which the mobile support 5 of the lower blade 6 slides. This blade has its cutting portion in the form of a very open V with the opening directed upwardly toward the fixed blade 3.

The body of the driving jack 7 is also fixed on the frame 1 for axial movement within guides 22. The piston 8 of this jack is mounted on a rod 9 which is extended to each side through the walls of the frame 1. Mounted symmetrically on the mobile support 5 are the links 10 which can rock about their pivot pin 11. Mounted symmetrically on the rod 9 are the links 10a which can rock on the one hand about the pivot pin 11a, whose support is fixed to the frame 1, and on the other hand about the pivot pin 13 fixed on the rod 9. The pivot pin 13 itself is adapted to be displaced within a groove 14 provided for this purpose in the link 10a. The links 10 and 10a are connected to one another by the pin 12.

Figure 3:
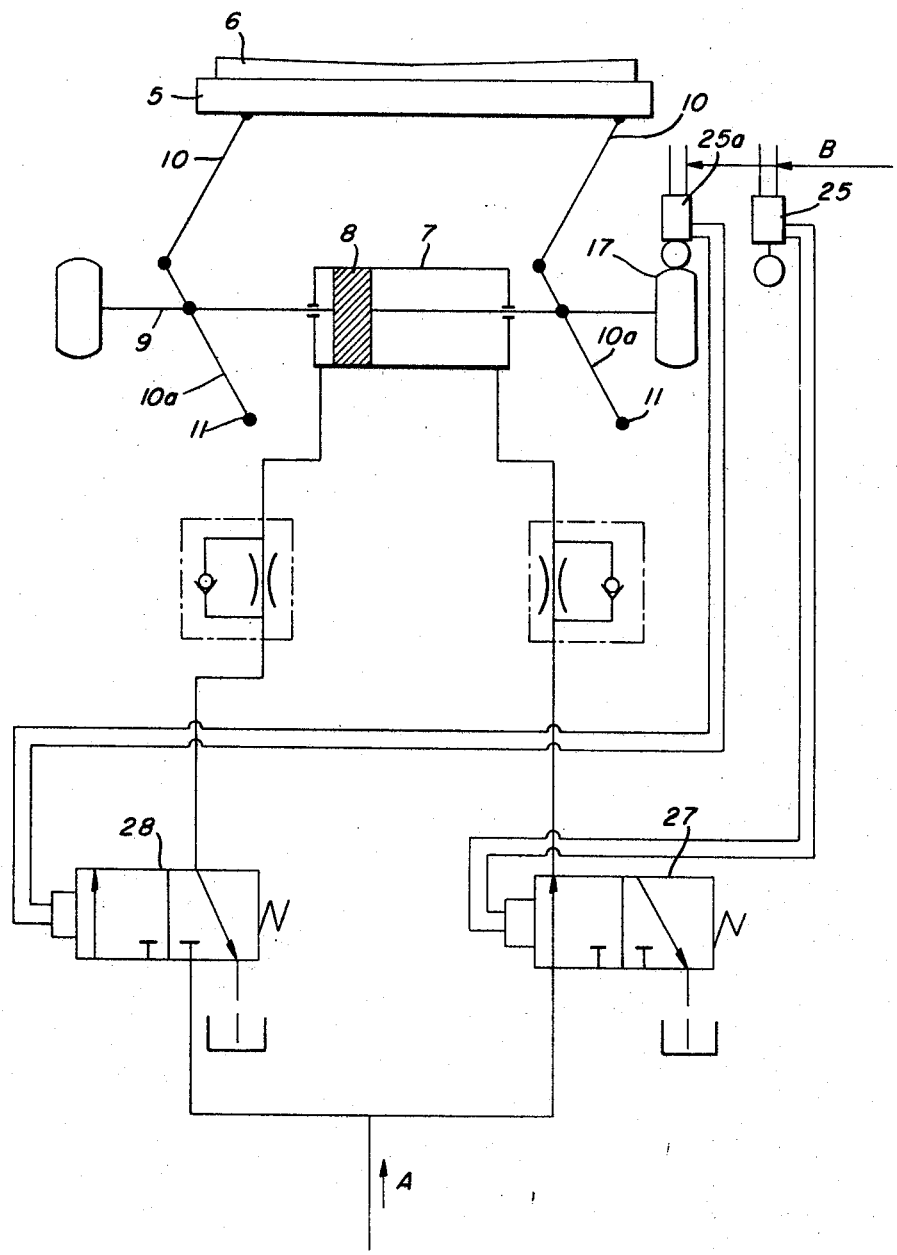

The supply circuit for supplying fluid to the jack 7 at each of the faces of the piston 8 comprises more particularly ducts, an electromagnetic valve, and a reservoir of fluid under pressure, which circuit is shown in FIGURE 3 and is conventional. Such a circuit may, for example, take the form of an electromagnetic valve providing pressure from a fluid reservoir of fluid alternately to opposite sides of piston 8 with switching to be controlled by action of the reciprocating jack rod 9. The electromagnetic valve is controlled by a contactor under control of the jack rod 9 as will be discussed hereinafter.

Figure 2:
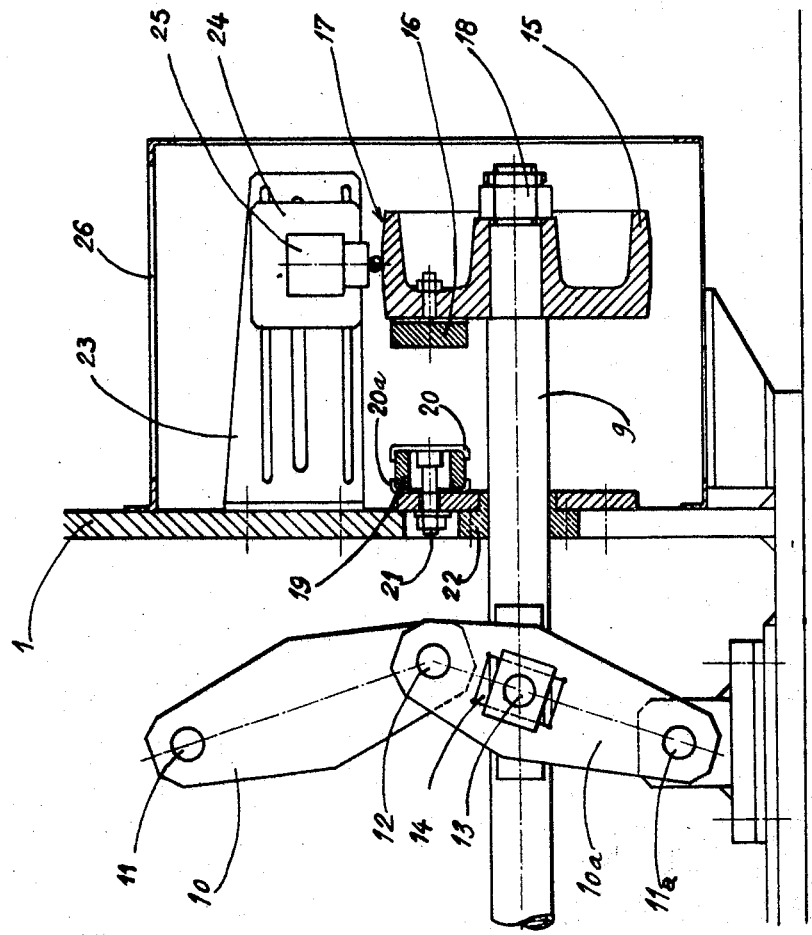

FIGURE 2 shows in detail a sectional view of one of the damping systems provided by the invention. On both ends of the rod 9, sliding through the guides 22 fixed to the frame 1, there is mounted a metallic part 15 held by a nut 18 screwed to the rod 9. On this part 15 there are mounted damping discs 16 made of flexible material. The peripheral portion of the part 15 is machined to serve as a cam 17. On the frame 1 there are arranged, opposite the discs 16, fixed damping units 19 only one of which has been shown in FIGURE 2 although a plurality are provided as seen in FIGURE 1. Each unit is constituted by a ring of compressible material 19 arranged between two metallic cups 20 and 20a, all these being held in position by the bolt 21 which is secured to the cup 20 and extends through cup 20a and a ring plate mounted on the guide 22. On the support 23 which is suspended on the frame 1, a plate 24 serving as a support for the contactor 25 is mounted for sliding adjustment in grooves 27, this contactor 25 being in periodic contact with the external cam-shaped profile 17 of the part 15 as the jack rod 9 reciprocates. All this assembly is protected by the detachable casing 26 or 26a.

The shearing machine which has just been described operates as follows:

When the rod 9 on which the piston 8 is mounted carries out a movement to one side or the other by means of the force applied to the piston, the links 10 and 10a connected to the mobile blade carrier 5 effect a complete upward and downward movement cycle of the cutting blade 6; the driving fluid being sent into the cylinder 7 from a fluid reservoir under control of an electromagnetic valve as shown in FIG. 3 which has a fluid passage of large cross section with the result that the displacement of the piston 8 is very sudden and the blade 6 is displaced very rapidly.

The cutting operation lasts for only a very short fraction of a second; and, during cutting, the strip is held firmly in position between the two blades, owing to the special wide-open V form of the mobile blade 6.

The end-of-travel impact of the piston 8 is damped by means of the damping device proposed and described hereinabove. The support 24 of the contactor 25 is accurately positioned on the part 23 so that the contactor 25 is actuated by cam surface 17 at the proper time to switch the electromagnetic valve effecting transfer of pressure to the opposite side of piston 8.

It is noted that while only the contents of casing 26 are illustrated in FIGURE 1, it is to be understood that in accordance with one embodiment of the invention the identical components are provided within casing 26a. Thus, the arrangement disclosed in FIGURE 2 may be provided within both of the casings 26 and 26a.

It is also within the contemplation of the invention that a contactor 25 be provided in only one of the casings and that additional switch means be provided, for example, on the support wall 1 within the same casing for controlling switching of the valve in coordination with the sole contactor 25 as shown in FIGURE 3.

In the drawing, arrow B indicates the order in which the contactors 25, 25a will be contacted by the cam 17. In the position of the piston 8 toward the end of the left stroke as shown in FIG. 3, the cam has left contact with the contactor 25, thus de-energizing the electromagnetic gate 27 which is dependent thereon. This will shut off the flow of compressed fluid (as indicated by the arrow A) to the right side of the jack 7. Upon the cam 17 contacting the contactor 25a, the second electromagnetic gate 28 will be energized and thus supply the fluid to the left side of the jack 7 which will instantly initiate a new cut thereby.

I have shown and described one embodiment in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

I claim:

1. In a rapid-cutting guillotine shearing machine for shearing metal sheet passing through said machine continuously at high speed, a frame, a stationary cutting blade and a movable cutting blade, fluid jack means having a horizontal rectilinear reciprocating jack rod and linkage means connecting said jack rod to said movable cutting blade for translating said movable blade into and out of engagement with said stationary blade, said frame supporting said jack means and said cutting blades, said jack rod extending through said frame on both ends thereof, said jack means including electromagnetic fluid valve means having a large fluid passage for controlling reciprocation of said jack rod, and damping means for effecting end-of-travel damping of said reciprocating jack rod.

2. The combination defined in Claim 1, wherein there is provided a casing surrounding each end of said jack rod and housing said damping means, said jack rod is terminated within each casing by a disc, said damping means including first and second resilient members mounted in opposed relationship on said frame and said disc, respectively, in each casing which first and second members are compressed against one another between the frame and the disc at the end of travel of said jack rod.

3. The combination defined in Claim 2 wherein at least the disc in one of said casings is provided with a cam surface, said electromagnetic fluid valve means including contactor means in said one casing for actuating said valve means in response to contact by said cam surface.

4. The combination defined in Claim 1 wherein said movable cutting blade has a V-shaped cutting edge opening directly outward at a large angle.

5. In a rapid-cutting guillotine shearing machine for shearing metal sheet passing through said machine continuously at high speed, a frame, a stationary cutting blade and a movable cutting blade mounted on said frame in vertical disposition, fluid jack means having a reciprocating jack rod supported by said frame for horizontal rectilinear movement only and linkage means connecting said jack rod to said movable cutting blade for translating said movable cutting blade into and out of engagement with said stationary cutting blade, said jack means including electromagnetic fluid valve means for effecting reciprocation of said jack rod including a piston mounted in a fluid cylinder and connected to said jack rod, and damping means operatively associated with each end of said jack rod for effecting end-of-travel damping thereof.

6. The combination defined in Claim 5 wherein said fluid valve means further includes contactor means responsive to reciprocation of said jack rod for switching fluid pressure to alternate sides of said piston in said fluid cylinder.

7. The combination defined in Claim 6 wherein a cam member is mounted at each extremity of said jack rod and said contactor means includes a mechanical switch member positioned for contact with said cam member at the end of travel thereof in a given direction.

8. The combination defined in Claim 7 wherein said damping means includes at least one first resilient member mounted on said cam member and at least one second resilient member mounted on said frame for contact with said first member at the end of travel of said jack rod in a given direction.

9. The combination defined in Claim 1, wherein said linkage means comprise a pivot pin fixed on either side of said jack means, and said pivot pin being adapted to reciprocate within a groove provided in said linkage means.